United States Patent
Weiß

(10) Patent No.: US 11,767,072 B2
(45) Date of Patent: Sep. 26, 2023

(54) METHOD FOR MOUNTING VEHICLE ELEMENTS TO A MOTOR VEHICLE REAR END

(71) Applicant: Dr. Ing. h.c. F. Porsche Aktiengesellschaft, Stuttgart (DE)

(72) Inventor: Thomas Weiß, Calw (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 17/702,965

(22) Filed: Mar. 24, 2022

(65) Prior Publication Data
US 2022/0332381 A1    Oct. 20, 2022

(30) Foreign Application Priority Data
Apr. 19, 2021   (DE) .................... 10 2021 109 726.6

(51) Int. Cl.
*B62D 65/16* (2006.01)
*B60Q 1/30* (2006.01)
*B62D 25/08* (2006.01)
*B62D 5/16* (2006.01)

(52) U.S. Cl.
CPC ............... *B62D 5/16* (2013.01); *B60Q 1/30* (2013.01); *B62D 25/08* (2013.01)

(58) Field of Classification Search
CPC ...... B62D 65/16; B62D 25/08; B62D 65/024; B62D 65/00; B62D 65/02; B60Q 1/30; B60Q 1/00; B60Q 1/3015; B60Q 1/303; B60Q 1/304

See application file for complete search history.

(56) References Cited

U.S. PATENT DOCUMENTS

| 5,497,303 | A | * | 3/1996 | Decinti ................... B60R 13/00 362/540 |
| 6,003,933 | A | * | 12/1999 | Rinklin ................... B62D 25/08 293/154 |
| 7,097,239 | B2 | * | 8/2006 | Lazzeroni ............ B60Q 1/0408 296/193.09 |
| 7,607,723 | B2 | * | 10/2009 | Bierjon ................ B62D 25/084 296/203.02 |
| 8,591,086 | B2 | | 11/2013 | Rinklin |
| 9,328,891 | B1 | * | 5/2016 | Dernar ................... F21S 43/195 |
| 9,527,450 | B1 | * | 12/2016 | Bellis ................... B62D 25/082 |
| 11,623,698 | B2 | * | 4/2023 | Marchlewski ......... B62D 25/02 296/203.04 |

(Continued)

FOREIGN PATENT DOCUMENTS

| DE | 19912181 A1 | 9/2000 |
| DE | 102007025141 A1 | 2/2008 |
| DE | 102009042415 A1 | 3/2011 |

*Primary Examiner* — Sarang Afzali
*Assistant Examiner* — Darrell C Ford
(74) *Attorney, Agent, or Firm* — RatnerPrestia

(57) ABSTRACT

A method for mounting vehicle elements of a motor vehicle rear end of a motor vehicle. The motor vehicle has a body on which a rear-end covering, rear lights and a trim are mounted. The mounting sequence is chosen in such a way that first of all the rear-end covering is arranged and fastened on the body, then the rear lights are arranged with orientation on the rear-end covering and then the trim is arranged with orientation on the rear-end covering and on the rear lights.

7 Claims, 2 Drawing Sheets

(56) References Cited

U.S. PATENT DOCUMENTS

Figure 1:
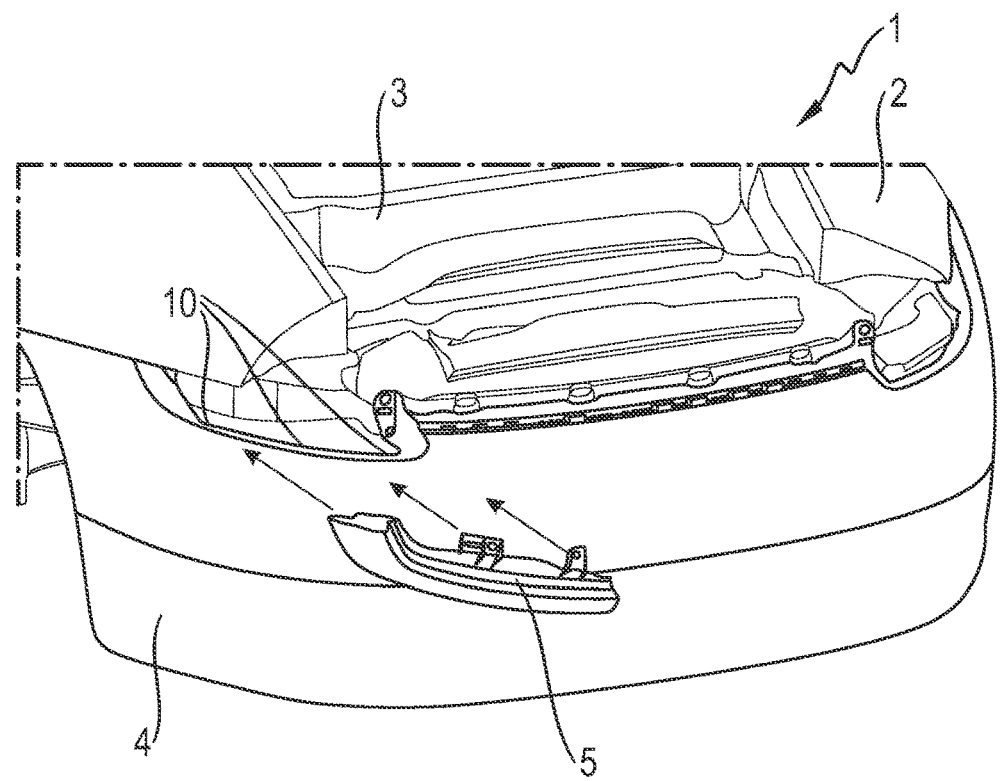

| | | | | |
|---|---|---|---|---|
| 2001/0046140 | A1* | 11/2001 | Chase | F21S 41/50 |
| | | | | 362/549 |
| 2003/0147253 | A1* | 8/2003 | Shy | B60Q 1/28 |
| | | | | 362/540 |
| 2006/0017304 | A1* | 1/2006 | Bischoff | B60Q 1/304 |
| | | | | 296/140 |
| 2009/0243340 | A1* | 10/2009 | Goldsberry | B60R 19/50 |
| | | | | 296/191 |
| 2012/0002434 | A1* | 1/2012 | Rajon | B60Q 1/2638 |
| | | | | 362/546 |
| 2017/0036627 | A1* | 2/2017 | Mawston | B62D 65/16 |
| 2018/0272926 | A1* | 9/2018 | Lyons | B60Q 1/2615 |
| 2019/0248278 | A1* | 8/2019 | Salter | F21S 43/245 |
| 2020/0164923 | A1* | 5/2020 | Marchlewski | B62D 65/16 |
| 2021/0300236 | A1* | 9/2021 | Aquilina | B60Q 1/2626 |

* cited by examiner

METHOD FOR MOUNTING VEHICLE ELEMENTS TO A MOTOR VEHICLE REAR END

CROSS-REFERENCE TO RELATED APPLICATION

This application claims priority to German Patent Application No. 10 2021 109 726.6, filed Apr. 19, 2021, the contents of such application being incorporated by reference herein in its entirety.

FIELD OF THE INVENTION

The invention relates to a method for mounting vehicle elements to a motor vehicle rear end.

BACKGROUND OF THE INVENTION

A motor vehicle having a body, in particular made of metal, is equipped or covered with various vehicle elements, with it being the case that the different manufacturing tolerances of the vehicle elements which are to be mounted give rise to visually undesired phenomena, because the vehicle elements which are to be mounted exhibit, after mounting, an undesired mounting image with undesired gap dimensions.

DE 199 12 181 A1, which is incorporated herein by reference, discloses a method for mounting vehicle elements, wherein use is made of a mounting support which is oriented and fastened, with the headlights being mounted after the mounting support has been mounted, and the headlights are fastened to the mounting support and then a bumper covering is mounted, after which a radiator grille is mounted. This method for mounting vehicle elements requires a mounting support which serves for the mounting of other components, with this mounting support being considered as an additional component, which means additional weight, and in addition having to be mounted to precise tolerances.

SUMMARY OF THE INVENTION

Described herein is a method for mounting vehicle elements of a motor vehicle rear end that, while being simplified, nevertheless allows the vehicle elements to be mounted to precise tolerances.

One exemplary embodiment of the invention relates to a method for mounting vehicle elements of a motor vehicle rear end of a motor vehicle, wherein the motor vehicle has a body on which a rear-end covering, rear lights and a trim are mounted, characterized in that the mounting sequence is chosen in such a way that first of all the rear-end covering is arranged and fastened on the body, then the rear lights are arranged with orientation on the rear-end covering and then the trim is arranged with orientation on the rear-end covering and on the rear lights. It can thus be ensured, specifically even without a mounting support, that the rear-end covering, the rear lights and the trim can be mounted with respect to one another on the rear end of the motor vehicle and that the relative spacings, joints and flushnesses correspond to the predetermined requirements even though the aforementioned mounted vehicle elements are produced with the existence of respective tolerances. It is thus possible here, while maintaining the tolerance band of the vehicle elements, nevertheless to ensure desired mounting that meets the visual and esthetic requirements.

In one exemplary embodiment, it is expedient if the rear-end covering is oriented at first predefined points and/or first predefined geometries of the body and is fastened to the body at first fastening points. The rear-end covering can thus be arranged and fastened on the body in a positionally correct manner. The fastening can be realized here in particular by screwing, plugging and/or latching.

In a further exemplary embodiment, it is expedient if the rear lights are oriented at second predefined points and/or second predefined geometries of the rear-end covering and are fastened to the body and/or to the rear-end covering at second fastening points. The two rear lights, which are to be positioned and fastened on the vehicle rear end with a spacing from one another, can thus be positioned and fastened relative to the rear-end covering in a positionally correct manner while observing predetermined visual specifications.

It is also advantageous if the trim is oriented at third predefined points and/or at third predefined geometries of the rear-end covering and/or of the rear lights and is fastened to the body and/or to the rear-end covering and/or to the rear lights at third fastening points. The trim can thus be positioned and fastened on the vehicle rear end relative to the rear-end covering and to the rear lights in a positionally correct manner while observing predetermined visual specifications.

It is also advantageous if the trim is arranged between the two rear lights. As a result, the trim is to be positioned relative to the two rear lights between the two rear lights, with the trim also to be positioned with respect to the rear-end covering, so that joints between the trim and the rear lights and relative to the rear-end covering and also flushnesses between the rear light surfaces and trim surface are achieved to the desired degree.

It is also advantageous if the trim is arranged with in each case a defined, in particular identical, joint to in each case one of the two rear lights and in particular so as to be flush with the rear lights. The joints between the trim and the rear lights and relative to the rear-end covering and also flushnesses between the rear light surfaces and trim surface can thus be achieved to the desired degree.

It is also expedient if a second predefined point and/or a second predefined geometry of the rear-end covering is a surface of the rear-end covering, a projecting pin of the rear-end covering, a round hole of the rear-end covering, an oblong hole of the rear-end covering and/or a rectangular hole of the rear-end covering. As a result, corresponding points or geometries can be used for orientation.

It is also advantageous in a further exemplary embodiment if a third predefined point and/or a third predefined geometry of the rear-end covering and/or of the rear light is a surface of the rear-end covering and/or of the rear light, a projecting pin of the rear-end covering and/or of the rear light of the rear-end covering and/or of the rear light, a round hole of the rear-end covering and/or of the rear light, an oblong hole of the rear-end covering and/or of the rear light and/or a rectangular hole of the rear-end covering and/or of the rear light. As a result, corresponding points or geometries can be used for orientation.

It is advantageous if the fastening occurs by means of screws, plug-in connections, latching connections and/or adhesive bonding. This allows secure connections and fastenings to be achieved, with it in particular also being possible to produce nonvisible connections.

It is particularly advantageous if the trim is a name trim. Here, the trim can thus bear a logo or lettering in order, for example, to identify the vehicle manufacturer or the like.

BRIEF DESCRIPTION OF THE DRAWING FIGURES

Figure 2:
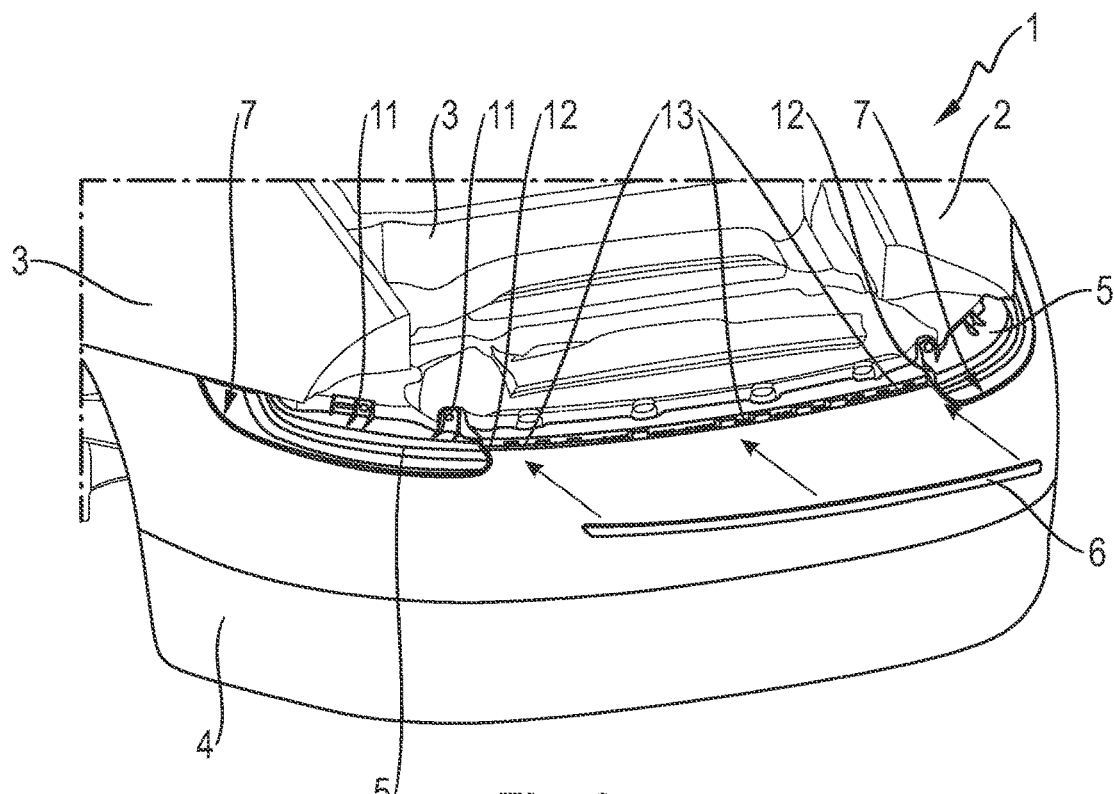
Figure 3:
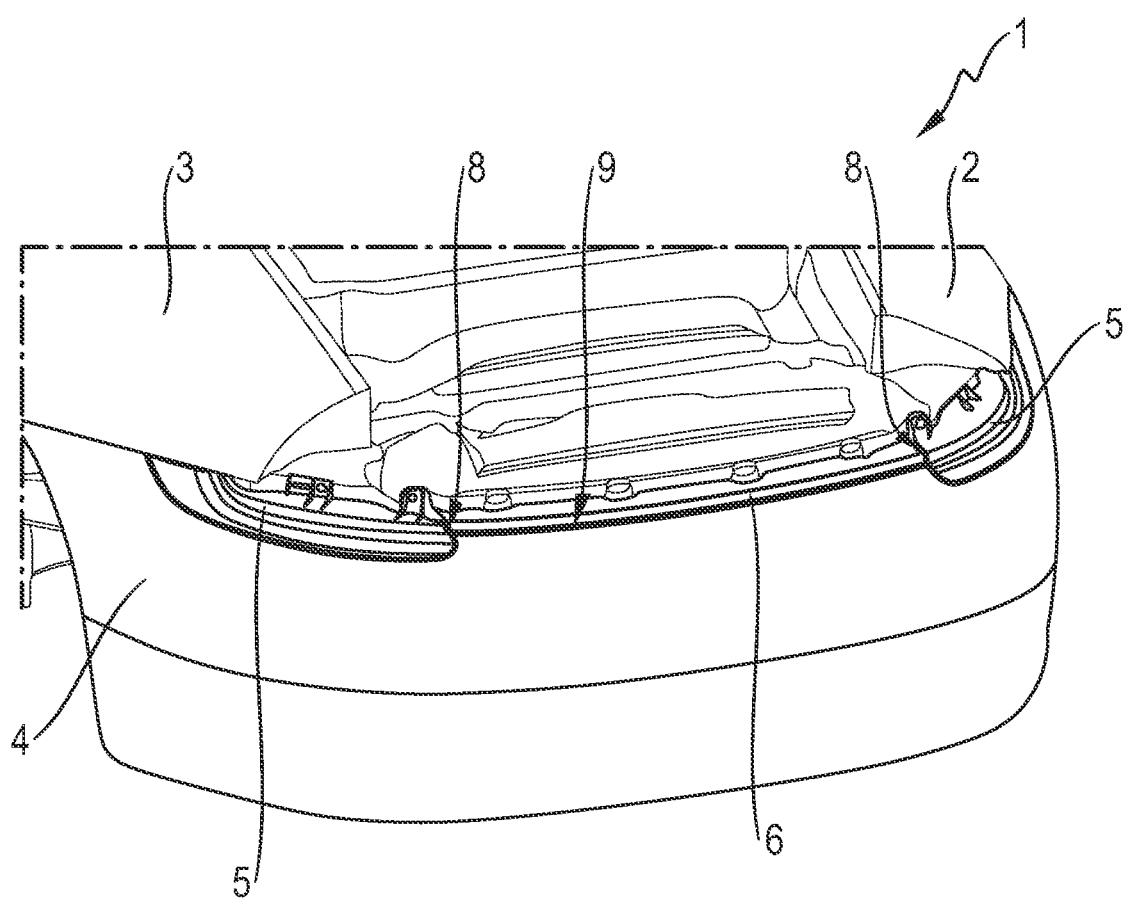

The invention will be discussed in detail below on the basis of an exemplary embodiment and with reference to the drawing. In the drawing:

FIG. 1 shows a schematic, perspective illustration of a motor vehicle rear end with a mounted rear-end covering to explain the method according to aspects of the invention, FIG. 2 shows a schematic, perspective illustration of a motor vehicle rear end with a mounted rear-end covering and with mounted rear lights to explain the method according to aspects of the invention, and FIG. 3 shows a schematic, perspective illustration of a motor vehicle rear end with a mounted rear-end covering, mounted rear lights and mounted trim to explain the method according to aspects of the invention.

DETAILED DESCRIPTION OF THE INVENTION

FIGS. 1 to 3 show a motor vehicle rear end 2 of a motor vehicle 1 in various mounting steps explain the method according to aspects of the invention.

The method according to aspects of the invention relates to a method for mounting vehicle elements 4, 5, 6 of a motor vehicle rear end 2 of a motor vehicle 1. Here, the motor vehicle has a body 3 on which a rear-end covering 4, rear lights 5 and a trim 6 as vehicle elements 4, 5, 6 are mounted. Here, said vehicle elements 4, 5, 6 are intended to be mounted in such a way that the joints 7, 8, 9 between the vehicle elements 4, 5, 6 are uniform and within the scope of the specifications, that is to say, for example, the joints 7 between the rear lights 5 and the rear-end covering 4 or the joints 8 between the trim 6 and the rear lights 5 or the joint 9 between the trim and the rear-end covering 4 and also the flushnesses between the rear light surfaces and trim surface are achieved to the desired degree.

According to aspects of the invention, the mounting sequence is chosen in such a way that first of all the rear-end covering 4 is arranged and fastened on the body 3, then the rear lights 5 are arranged with orientation on the rear-end covering 4 and then the trim 6 is arranged with orientation on the rear-end covering 4 and on the rear lights 5. This results in a respective relative arrangement being achieved, with the specifications relating to the joints 7, 8, 9 and the flushness being achieved. The joints 7, 8, 9 and the flushness can be achieved here in such a way that the vehicle elements 4, 5, 6 which are to be mounted can be moved or displaced in the corresponding directions in order to achieve the specifications before the fastening then occurs in the intended mounting position.

When positioning the rear-end covering 4, the rear-end covering 4 is oriented at first predefined points and/or first predefined geometries of the body 3 to ensure that it is positioned in a positionally correct manner such that it can then be fastened to the body 3 at first fastening points. It can be optional here for first points and/or geometries to be different from the first fastening points, or they can also be partly or completely identical.

The rear lights 4 are then oriented at second predefined points 10 and/or second predefined geometries 10 of the rear-end covering 4 and are fastened to the body 3 and/or to the rear-end covering 4 at second fastening points 11.

The trim 6 is then oriented at third predefined points 12 and/or at third predefined geometries 12 of the rear-end covering 4 and/or of the rear lights 5 and is fastened to the body 3 and/or to the rear-end covering 4 and/or to the rear lights 5 at third fastening points 13.

As can be seen from FIG. 3, the trim 6 is arranged between the two rear lights 5. The trim 6 can also be seated on the rear-end covering 4.

The trim 6 is mounted in such a way that the trim 6 is arranged with in each case a defined, in particular identical, joint 8 to in each case one of the two rear lights 5 and in particular so as to be flush with the rear lights 5. The mounting is also such that the joint 9 between the trim 6 and rear-end covering 4 corresponds to the specifications with regard to joint width and joint uniformity.

A second predefined point 10 and/or a second predefined geometry 10 of the rear-end covering 4 is, for example, a surface of the rear-end covering 4, a projecting pin of the rear-end covering 4, a round hole of the rear-end covering 4, an oblong hole of the rear-end covering 4 and/or a rectangular hole of the rear-end covering 4.

A third predefined point 12 and/or a third predefined geometry 12 of the rear-end covering 4 and/or of the rear light 5 is, for example, a surface of the rear-end covering 4 and/or of the rear light 5, a projecting pin of the rear-end covering 4 and/or of the rear light 5, a round hole of the rear-end covering 4 and/or of the rear light 5, an oblong hole of the rear-end covering 4 and/or of the rear light 5 and/or a rectangular hole of the rear-end covering 4 and/or of the rear light 5.

Here, the fastening of the rear-end covering 4, of the rear lights 5 and/or of the trim 6 can occur by means of screws, plug-in connections, latching connections and/or adhesive bonding.

LIST OF REFERENCE SIGNS

1 Motor vehicle
2 Motor vehicle rear end
3 Body
4 Vehicle element/rear-end covering
5 Vehicle element/rear light
6 Vehicle element/trim
7 Joint
8 Joint
9 Joint
10 Second predefined point/geometry
11 Second fastening point
12 Third predefined point/geometry
13 Third fastening point

What is claimed:

1. A method for mounting vehicle elements to a motor vehicle rear end of a motor vehicle, said method comprising the steps of:
    (a) fastening a rear end covering on two opposing rear side panels of a body of the motor vehicle at first fastening points on the body of the motor vehicle, wherein the rear end covering is positioned at a location beneath the two opposing rear side panels,
    (b) following step (a), positioning two rear lights on the rear end covering, and positioning each of the two rear lights beneath a respective one of the two opposing rear side panels,
    (c) following steps (a) and (b), positioning trim on the rear end covering and on the rear lights at a location between the rear lights, and
    (d) following steps (a) through (c), fastening each of the two rear lights to the rear end covering at second fastening points defined on the rear end covering, and fastening the trim to the rear end covering at third fastening points defined on the rear end covering, wherein the second and third fastening points are located beneath the two opposing rear side panels of the body, wherein each fastening step comprises fastening using screws, plugs, latches or adhesive.

2. The method as claimed in claim 1, wherein the trim is arranged so as to be flush with the rear lights.

3. The method as claimed in claim 1, wherein each second fastening point is a surface of the rear end covering, a projecting pin of the rear end covering, a round hole of the rear end covering, an oblong hole of the rear end covering and/or a rectangular hole of the rear end covering.

4. The method as claimed in claim 1, wherein each third fastening point is a surface of the rear end covering, a projecting pin of the rear end covering, a round hole of the rear covering, an oblong hole of the rear end covering and/or a rectangular hole of the rear end covering.

5. The method as claimed in claim 1, wherein the trim includes logos or lettering.

6. The method as claimed in claim 1, wherein the trim is a stationary component that extends directly between the rear lights and is fixedly connected to the rear end covering.

7. The method as claimed in claim 1, wherein the rear end covering includes cutouts for receiving the rear lights.

\* \* \* \* \*